(12) United States Patent
Kao

(10) Patent No.: US 7,896,610 A0
(45) Date of Patent: Mar. 1, 2011

(54) THREE-DIMENSIONALLY VIBRATION-PREVENTING BUFFERING MECHANISM

(75) Inventor: Cheng-Shen Kao, Taipei (TW)

(73) Assignee: Inventec Corporation (TW)

( * ) Notice: Subject to any disclaimer, the term of this patent is extended or adjusted under 35 U.S.C. 154(b) by 1635 days.

(21) Appl. No.: 10/911,178

(22) Filed: Aug. 4, 2004

(65) Prior Publication Data

US 2006/0029492 A1 Feb. 9, 2006

(51) Int. Cl.
*F01D 25/04* (2006.01)
(52) U.S. Cl. .............. 415/119; 415/213.1; 415/214.1
(58) Field of Classification Search .............. 415/119, 415/213.1, 214.1; 416/224 R; 417/423.15, 417/363
See application file for complete search history.

(56) References Cited

U.S. PATENT DOCUMENTS

| | | | | |
|---|---|---|---|---|
| 3,261,543 | A * | 7/1966 | Holgersson | 416/244 R |
| 3,601,502 | A * | 8/1971 | Harter | 416/244 R |
| 6,401,806 | B1 * | 6/2002 | Lee et al. | 165/80.3 |
| 6,744,630 | B2 * | 6/2004 | Hutchinson et al. | 361/687 |
| 6,894,897 | B1 * | 5/2005 | Nagurny et al. | 361/695 |
| 2004/0170508 | A1 * | 9/2004 | Seo et al. | 417/363 |

* cited by examiner

*Primary Examiner* — Edward K. Look
*Assistant Examiner* — Nathan Wiehe
(74) *Attorney, Agent, or Firm* — Peter F. Corless; Steven M. Jensen; Edwards Angell Palmer & Dodge LLP

(57) ABSTRACT

A three-dimensionally vibration-preventing buffering mechanism is proposed, which is designed for use in conjunction with a dynamic module for the purpose of buffering the three dimensional vibrations of the dynamic module during operation, and which is characterized by the use of a group of specially-designed chained elastic members, each being composed of at least three integrally-linked flexure hinges whose axes of concavity are oriented respectively in parallel with the three axes of a three-dimensional rectangular coordinate system, so that the vibrations of the dynamic module in all three dimensional directions can be respectively buffered by these flexure hinges to provide a three-dimensional vibration-preventing buffering effect.

7 Claims, 5 Drawing Sheets

THREE-DIMENSIONALLY VIBRATION-PREVENTING BUFFERING MECHANISM

BACKGROUND OF THE INVENTION

1. Field of the Invention

This invention relates to mechanics technology, and more particularly, to a three-dimensionally vibration-preventing buffering mechanism which is designed for use in conjunction with a dynamic module, such as a heat-dissipating fan unit used in electronic systems, for the purpose of buffering the three-dimensional vibrations of the fan unit during operation to prevent the fan unit from knocking against nearby electronic components that could otherwise cause damage to entire electronic systems.

2. Description of Related Art

Electronic systems during operation typically produce large amounts of heat due to consumption of electrical power, and if this heat is undissipated, it would result in burnout of electrical components or chips (such as CPUs), thus causing the electronic system to shut down or fail to operate normally. One solution to this problem is to mount heat-dissipating devices, such as electrical fan units, for dissipating heat in the electronic system during operation.

One drawback to the use of fan-based heat-dissipating module in electronic systems, however, is that since a fan unit is a dynamic module, it would produce vibrations in all directions during operation that would make it likely to bump against nearby electronic components and cause damage to the same.

One solution to the foregoing problem is to provide a spring-based buffering mechanism to the fan unit, so as to use the elasticity of springs to provide the desired three-dimensional vibration-preventing buffering effect.

One drawback to the forgoing solution, however, is that each spring can only be used for the buffering of the fan unit in one direction, and therefore if it is desired to provide a three-dimensional vibration-preventing buffering effect, it requires the arrangement of many separate springs in different directions to provide the desired three-dimensional vibration-preventing buffering effect, which would undesirably increase the overall size of the fan unit such that the fan unit would occupy more space in assembly.

SUMMARY OF THE INVENTION

It is therefore an objective of this invention to provide a three-dimensionally vibration-preventing buffering mechanism that is more compact in size than prior art for providing a three-dimensional vibration-preventing buffering effect to a heat-dissipating fan unit in electronic systems.

The three-dimensionally vibration-preventing buffering mechanism according to the invention is designed for use in conjunction with a dynamic module, such as a heat-dissipating fan unit used in electronic system, for the purpose of buffering the three-dimensional vibrations of the fan unit during operation to prevent the fan unit from knocking against nearby components that could otherwise damage the nearby components.

The three-dimensionally vibration-preventing buffering mechanism according to the invention is characterized by the use of a group of specially-designed chained elastic members, each being composed of at least three integrally-linked flexure hinges whose axes of concavity are oriented respectively in parallel with the three axes of a three-dimensional rectangular coordinate system, so that the vibrations of the dynamic module in all three dimensional directions can be respectively buffered by these flexure hinge to provide a three-dimensional vibration-preventing buffering effect.

Compared to prior art, since all the chained elastic members utilized by the invention are each an integrally-formed piece, it allows the three-dimensionally vibration-preventing buffering mechanism of the invention to be made more compact in size and thus occupy less space than prior art, allowing the design to be more convenient and flexible. The invention is therefore more advantageous to use than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The three-dimensionally vibration-preventing buffering mechanism according to the invention is disclosed in full details by way of several preferred embodiments in the following with reference to the accompanying drawings.

Figure 1:
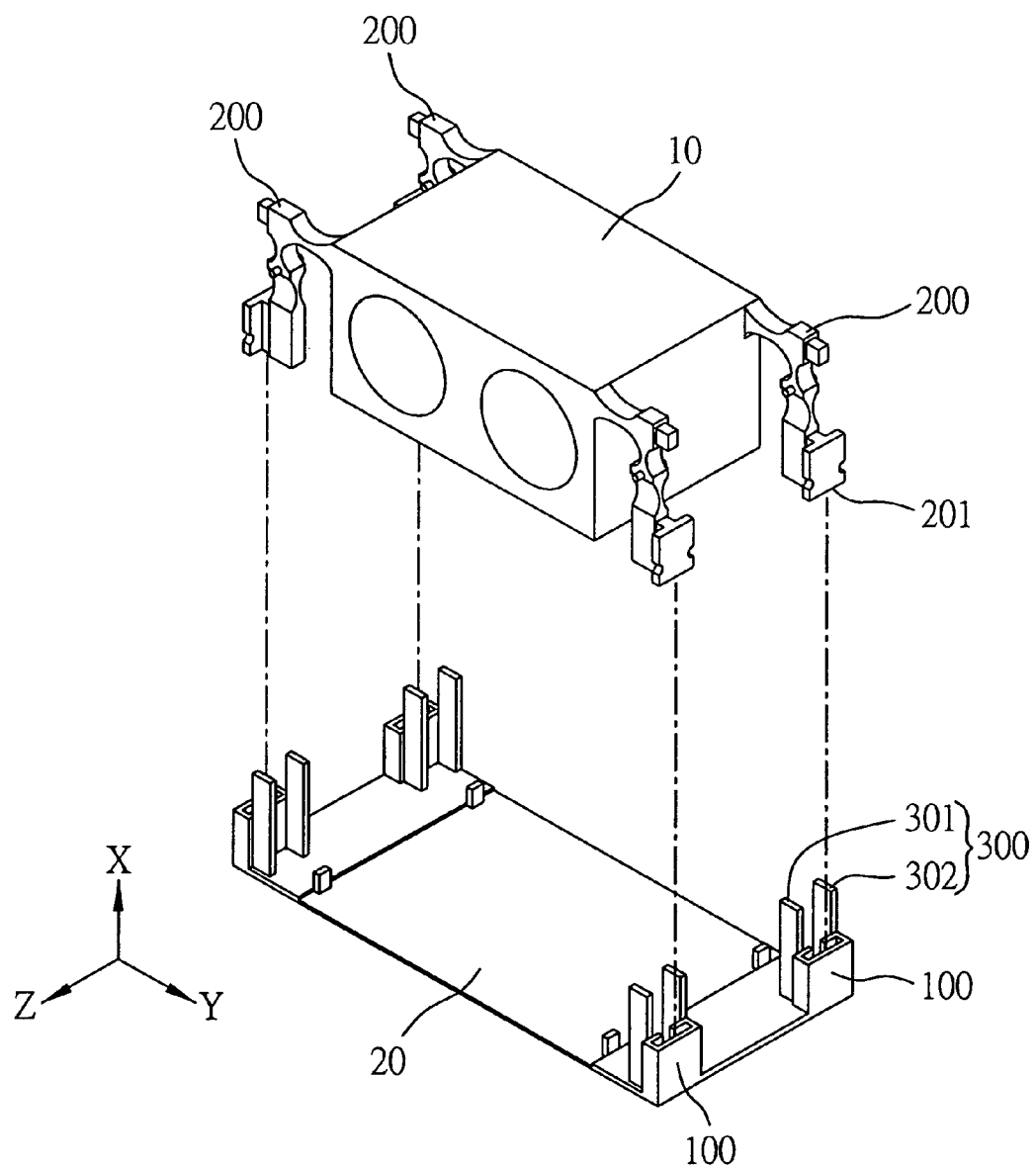
FIG. 1 is a schematic diagram showing an exploded perspective view of a first preferred embodiment of the three-dimensionally vibration-preventing buffering mechanism according to the invention.

FIG. 1 is a schematic diagram showing an exploded perspective view of a first preferred embodiment of the three-dimensionally vibration-preventing buffering mechanism according to the invention, which is designed for use in conjunction with a dynamic module, such as a heat-dissipating fan unit 10 used in an electronic system (not shown), for the purpose of buffering the three-dimensional vibrations of the fan unit 10 (in reference to the three axis X, Y, Z of a three-dimensional rectangular coordinate system) during operation to prevent the fan unit 10 from being shaken violently during operation that could otherwise cause damage to nearby electronic components in the electronic system (not shown).

As shown in FIG. 1, the three-dimensionally vibration-preventing buffering mechanism of the invention comprises: (a) a locking mechanism 100; (b) a group of chained elastic members 200; and (c) a stoppage mechanism 300.

In practical application, the three-dimensionally vibration-preventing buffering mechanism is used for integration to a dynamic module (such as a fan unit 10) and a chassis 20 (such as a printed circuit board), wherein the chassis 20 is used for mounting the fan unit 10 thereon (since the mounting structure for mounting the fan unit 10 on the chassis 20 is not within the spirit and scope of the invention, detailed description thereof will not be given in this specification), and which is provided with a plurality of locking mechanisms 100 respectively on the periphery (such on the 4 corners) thereof for locking the chained elastic members 200 securely on the chassis 20. In the preferred embodiment of FIG. 1, for instance, the locking mechanisms 100 are each a bolting-type of locking mechanism, which is capable of being engaged with an insertion bolting member 201 provided on the bottom of each of the chained elastic members 200 for the purpose of securely locking the chained elastic members 200 in position on the chassis 20.

Figure 2:
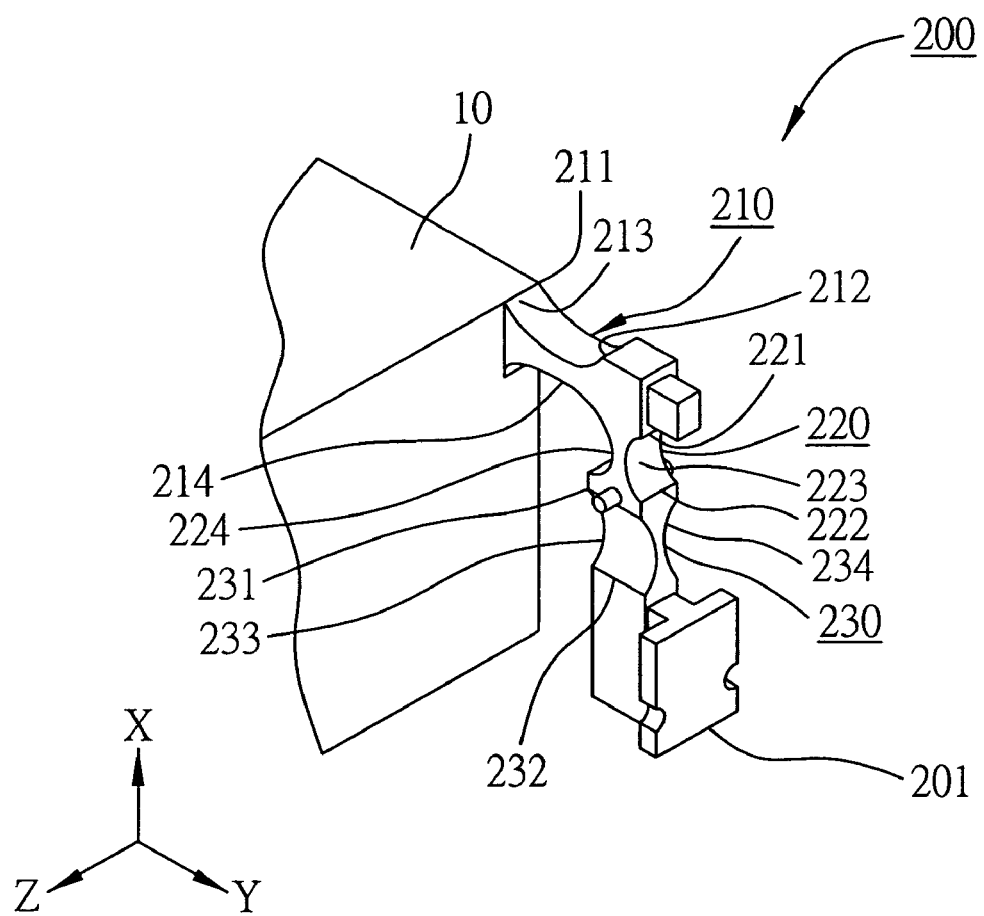
FIG. 2 is a schematic diagram showing a perspective view of each chained elastic member utilized by the three-dimensionally vibration-preventing buffering mechanism of the invention.

As shown in FIG. 2, each chained elastic member 200 includes at least three integrally-linked and structurally-identical flexure hinges, including a first flexure hinge 210, a second flexure hinge 220, and a third flexure hinge 230. Since these three flexure hinges 210, 220, 230 are entirely identical in structure, only the first flexure hinge 210 is representatively used in the following to describe the structure thereof.

Figure 3A:
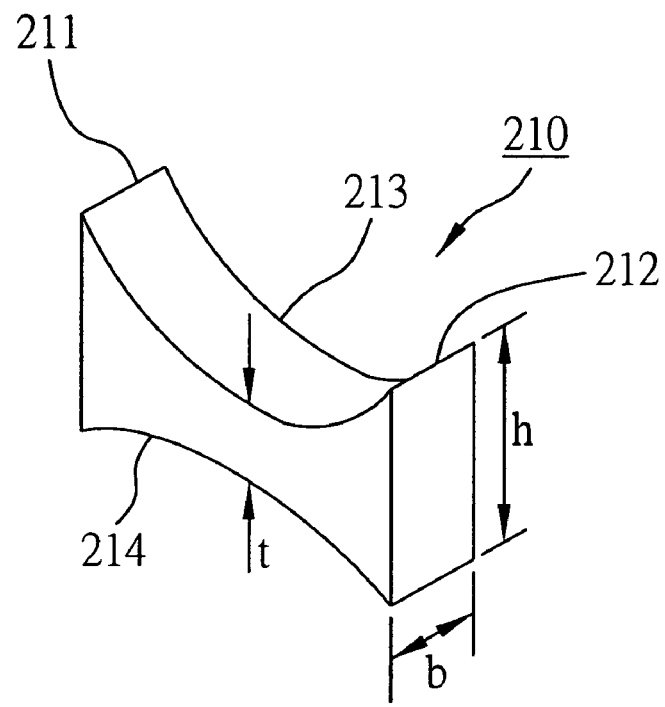
FIG. 3A is a schematic diagram showing a perspective view of a flexure hinge of one chained elastic member utilized by the three-dimensionally vibration-preventing buffering mechanism of the invention.
Figure 3B:
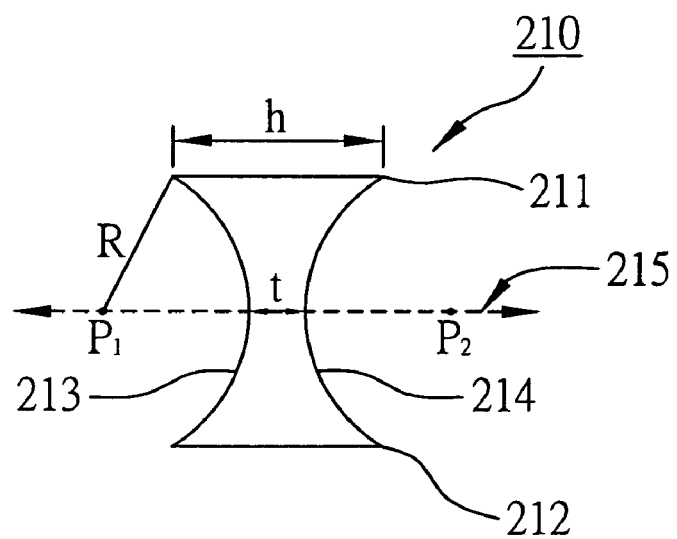
FIG. 3B is a schematic diagram showing the same of FIG. 3A in a side view.

As shown in FIGS. 3A–3B, the first flexure hinge 210 is made of an elastically flexible material, such as plastics, and whose body includes a first end side 211 and a second end side 212 and between the first end side 211 and the second end side 212 is the first flexure hinge 210 formed with a pair of concaved surfaces 213, 214 on opposite lateral sides. Similarly the second flexure hinge 220 and third flexure hinge 230 are formed by concave surfaces 223,224,233,234, respectively. The connection of the two respective central points of radius of curvature P1, P2 of the two concaved surfaces 213, 214 defines an axis of concavity 215 as shown in FIG. 3B. Due to the formation of the concaved surfaces 213, 214, the first flexure hinge 210 has a centrally-thinned structure that makes the first flexure hinge 210 more flexible along the axis of concavity 215 so that it would more easily be bent along the axis of concavity 215 when subjected to an external force (i.e., vibration). The flexibility of the first flexure hinge 210 is dependent on the following parameters: elasticity of material, side lengths (h, b) of the first end side 211 and second end side 212, radius of curvature (R) of the concaved surfaces 213, 214, and thickness of the thinnest part between the concaved surfaces 213, 214. For various different kinds of dynamic modules, the desired flexibility of each flexure hinge can be obtained by simply modifying these four parameters. In practice, the characteristic relationship between flexibility and these four parameters can be theoretically deduced to obtain the desired value of flexibility based on these four parameters.

Referring back to FIG. 2, in each of the chained elastic members 200, the first flexure hinge 210 is arranged in such a manner that its first end side 211 is linked to the body (i.e., casing) of the fan unit 10, and its axis of concavity 215 is oriented in parallel to the X-axis of the three-dimensional rectangular coordinate system; the second flexure hinge 220 is arranged in such a manner that its first end side 221 is integrally linked to the second end side 212 of the first flexure hinge 210, and its axis of concavity (not shown) is oriented in parallel to the Y-axis of the three-dimensional rectangular coordinate system; and the third flexure hinge 230 is arranged in such a manner that its first end side 231 is integrally linked to the second end side 222 of the second flexure hinge 220, its second end side 232 is fixed with an insertion bolting member 201, and its axis of concavity (not shown) is oriented in parallel to the Z-axis of the three-dimensional rectangular coordinate system.

As shown in FIG. 1, the stoppage mechanism 300 is for example arranged beside the locking mechanism 100 on the chassis 20, and which is composed of a pair of oppositely-arranged plates 301, 302 which are used during operation of the fan unit 10 for confining the vibration of the chained elastic member 200 within the space betweens the two plates 301, 302 to thereby provide a protective stoppage effect that can prevent each chained elastic member 200 from being damaged due to being overly swayed when subjected to large external force.

Figure 4:
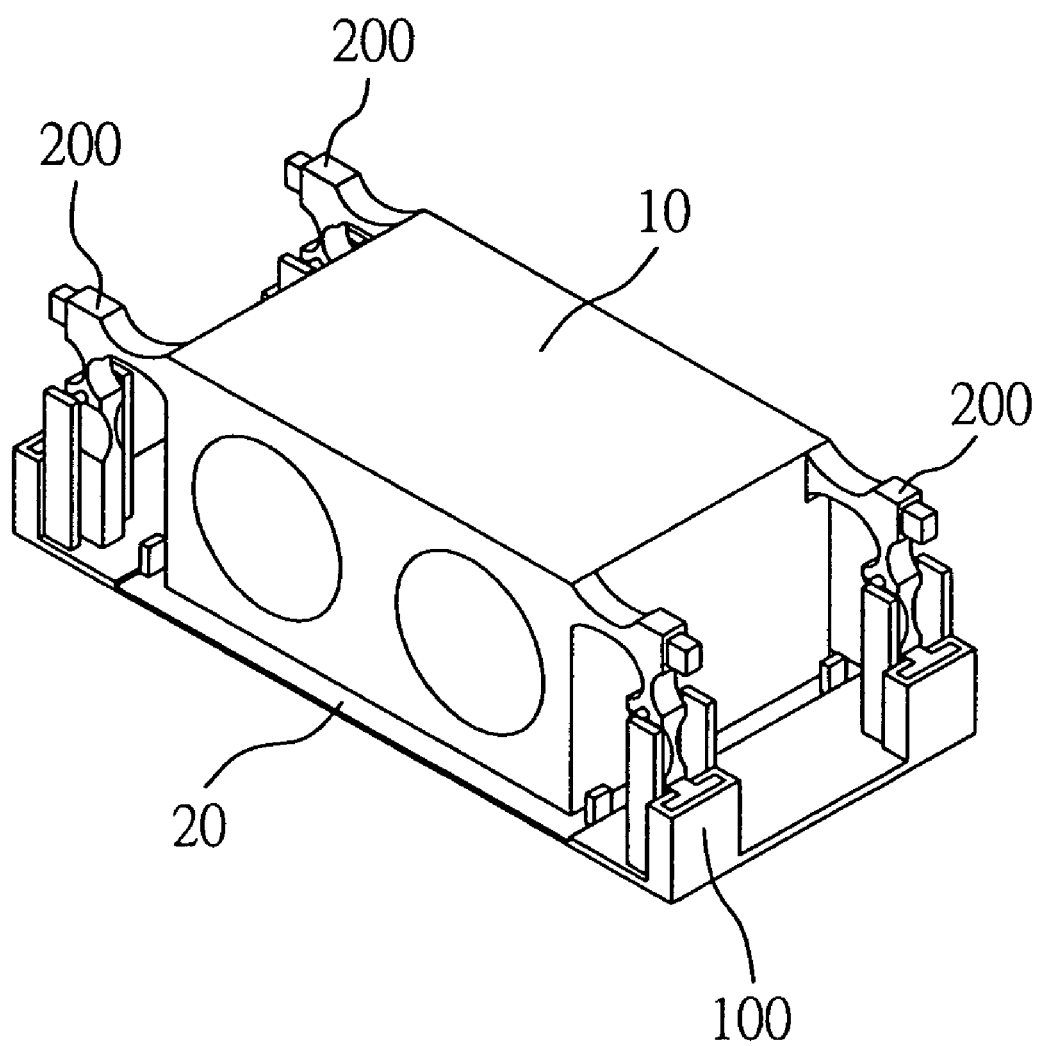
FIG. 4 is a schematic diagram showing the same of FIG. 1 after being assembled into a combined body.

Referring next to FIG. 4, during assembly process, the first step is to mount the fan unit 10 onto the chassis 20 (since the mounting of the fan unit 10 on the chassis 20 is not within the spirit and scope of the invention, detailed description thereof will not be given in this specification), and then engage the insertion bolting member 201 on the bottom of each chained elastic member 200 with the locking mechanism 100 on the fan unit 10 for securely mounting the fan unit 10 on the chassis 20.

During actual operation of the fan unit 10, the vibration of the fan unit 10 in the X-axis direction will be buffered by the first flexure hinge 210 of the chained elastic member 200, the vibrations of the fan unit 10 in the Y-axis direction will be buffered by the second flexure hinge 220 of the same, and the vibration of the fan unit 10 in the Z-axis direction will be buffered by the third flexure hinge 230 of the same. As a result, the three-dimensionally vibration-preventing buffering mechanism of the invention can provide a three-dimensional vibration-preventing buffering effect to the fan unit 10.

Figure 5:
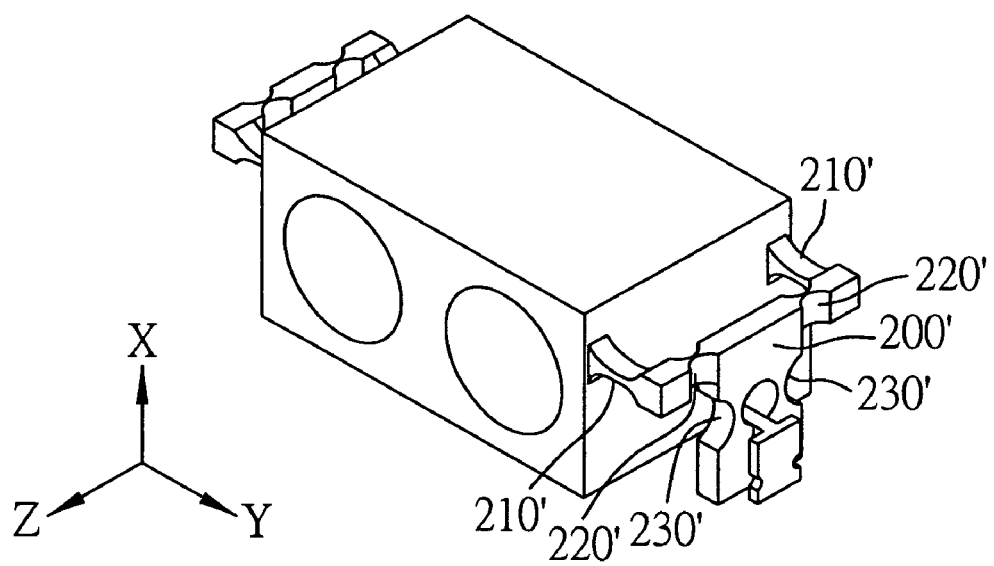
FIG. 5 is a schematic diagram showing a perspective view of a second preferred embodiment of the three-dimensionally vibration-preventing buffering mechanism according to the invention.

FIG. 5 is a schematic diagram showing a perspective view of a second preferred embodiment of the three-dimensionally vibration-preventing buffering mechanism according to the invention. In the previous first preferred embodiment, each chained elastic member 200 includes only one X-axis oriented flexure hinge 210, one Y-axis oriented flexure hinge 220, and one Z-axis oriented flexure hinge 230; and whereas in this second preferred embodiment, each chained elastic member (here designated instead by the reference numeral 200) includes two X-axis oriented flexure hinges 210', two Y-axis oriented flexure hinges 220', and two Z-axis oriented flexure hinges 230'. Fundamentally, the number of the flexure hinges that are respectively oriented in X-axis, Y-axis, and Z-axis can be an arbitrary design choice, but should include at least one X-axis oriented flexure hinge, at least one Y-axis oriented flexure hinge, and at least one Z-axis oriented flexure hinge.

In conclusion, the invention provides a three-dimensionally vibration-preventing buffering mechanism for use in conjunction with a dynamic module, for the purpose of buffering the three-dimensional vibrations of the dynamic module during operation, and which is characterized by the use of a group of specially-designed chained elastic members, each being composed of at least three integrally-linked flexure hinges oriented respectively in parallel with the three axes of a three-dimensional rectangular coordinate system, so that the vibrations of the dynamic module in all three-dimensional directions can be respectively buffered by these flexure hinges to provide a three-dimensional vibration-preventing buffering effect. Compared to prior art, since all the chained elastic members utilized by the invention are each an integrally-formed piece, it allows the three-dimensionally vibration-preventing buffering mechanism of the invention to be made more compact in size and thus occupy less space than prior art, allowing the design to be more convenient and flexible. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A three-dimensionally vibration-preventing buffering mechanism for integration to a dynamic module for buffering the three dimensional vibrations of the dynamic module during operation in reference to the three axis of a three-dimensional rectangular coordinate system;

the three-dimensionally vibration-preventing buffering mechanism comprising:

a group of chained elastic members, each of which includes:

a first flexure hinge having a first end side and a second end side, wherein the first end side thereof is fixedly attached to the body of the dynamic module, and between the first end side and the second end side thereof is the first flexure hinge formed with a pair of concaved surfaces on opposite lateral sides, with the axis of concavity of the two concaved surfaces substantially oriented in parallel to a first axis in the three-dimensional rectangular coordinate system;

a second flexure hinge, which is substantially similar in structure as the first flexure hinge, having a first end side and a second end side, wherein the first end side thereof is fixedly linked to the second end side of the first flexure hinge, and between the first end side and the second end side thereof is the second flexure hinge formed with a pair of concaved surfaces on opposite lateral sides, with the axis of concavity of the two concaved surfaces thereof substantially oriented in parallel to a second axis in the three-dimensional rectangular coordinate system;

a third flexure hinge, which is substantially similar in structure as the first flexure hinge and the second flexure hinge, having a first end side and a second end side, wherein the first end side thereof is fixedly linked to the second end side of the second flexure hinge, and between the first end side and the second end side thereof is the third flexure hinge formed with a pair of concaved surfaces on opposite lateral sides, with the axis of concavity of the two concaved surfaces thereof substantially oriented in parallel to a third axis in the three-dimensional rectangular coordinate system; and a group of locking mechanisms for securely locking the second end side of the third flexure hinge to a chassis.

2. The three-dimensionally vibration-preventing buffering mechanism of claim 1, wherein the dynamic module is a heat-dissipating fan unit.

3. The three-dimensionally vibration-preventing buffering mechanism of claim 1, wherein each locking mechanism is a bolting-type of locking mechanism.

4. The three-dimensionally vibration-preventing buffering mechanism of claim 1, wherein each chained elastic member is made of plastics.

5. The three-dimensionally vibration-preventing buffering mechanism of claim 1, further comprising:

a stoppage mechanism for confining the vibration of each chained elastic member within a predefined space to provide a protective stoppage effect for each chained elastic member.

6. The three-dimensionally vibration-preventing buffering mechanism of claim 5, wherein the stoppage mechanism includes a pair of oppositely-arranged plates spaced at a predetermined distance to define the confining space.

7. The three-dimensionally vibration-preventing buffering mechanism of claim 1, wherein the chassis is a printed circuit board.

* * * * *